(12) United States Patent
Liang et al.

(10) Patent No.: US 12,314,594 B2
(45) Date of Patent: May 27, 2025

(54) MANAGING BANDWIDTH QUOTAS FOR REPLICATION SESSIONS ESTABLISHED BETWEEN SOURCE AND DESTINATION STORAGE SYSTEMS

(71) Applicant: Dell Products L.P., Round Rock, TX (US)

(72) Inventors: Shuangshuang Liang, Zunyi (CN); Chaojun Zhao, Chengdu (CN); Yang Zhang, Chengdu (CN); Jingyi Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 18/105,995

(22) Filed: Feb. 6, 2023

(65) Prior Publication Data

US 2024/0184474 A1    Jun. 6, 2024

(30) Foreign Application Priority Data

Dec. 5, 2022 (CN) .......................... 202211554081.0

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01)

(58) Field of Classification Search
CPC ......... G06F 3/065; G06F 3/0604; G06F 3/067
See application file for complete search history.

(56) References Cited

U.S. PATENT DOCUMENTS

| 7,539,745 | B1 * | 5/2009 | Wang .................... H04L 47/762 709/224 |
| 7,769,722 | B1 * | 8/2010 | Bergant ................ G06F 16/125 707/681 |

(Continued)

OTHER PUBLICATIONS

Dell Technologies, "Dell Unity: Replication Technologies," Technical White Paper, H15088.8, A Detailed Review, Apr. 2022, 87 pages.

(Continued)

*Primary Examiner* — Kenneth M Lo
*Assistant Examiner* — Alexander Vinnitsky
(74) *Attorney, Agent, or Firm* — Ryan, Mason & Lewis, LLP

(57) ABSTRACT

An apparatus comprises a processing device configured to determine syncing progress metrics for replication sessions established between a source and a destination storage system, each of the replication sessions being associated with a recovery point objective and having an assigned bandwidth quota. The processing device is also configured to identify whether a first replication session is not expected to meet its associated first recovery point objective based at least in part on its determined first syncing progress metric and whether at least a second replication session is expected to meet its associated second recovery point objective based at least in part on its determined second syncing progress metric. The processing device is further configured, responsive to identifying the first and second replication sessions, to update a first assigned bandwidth quota for the first replication session and a second assigned bandwidth quota for the second replication session.

19 Claims, 23 Drawing Sheets

(56) References Cited

U.S. PATENT DOCUMENTS

2006/0005074 A1* 1/2006 Yanai ................. G06F 11/2066
  714/6.32
2020/0409563 A1* 12/2020 Parasnis ................. G06F 3/067
2022/0318264 A1* 10/2022 Jain ..................... G06F 11/2094

OTHER PUBLICATIONS

Dell Inc., "Dell DR Series System Administrator Guide," Dec. 2015, 186 pages.
Dell Technologies, "Asynchronous Remote Replication Technical Report—Dell PowerVault MD3 Storage Arrays," A White Paper, Dec. 2012, 23 pages.

* cited by examiner

| SESSION | RPO ($R$) | SYNCING TIME ($ST$) | SYNCING PROGRESS ($SP$) | SNAPSHOT DIFFERENTIAL ($SD$) |
|---|---|---|---|---|
| S1 | R1 | ST1 | SP1 | SD1 |
| S2 | R2 | ST2 | SP2 | SD2 |
| S3 | R3 | ST3 | SP3 | SD3 |
| ... | ... | ... | ... | ... |
| Sn | Rn | STn | SPn | SDn |

FIG. 6

| SESSION | QUOTA (Q) |
|---------|-----------|
| S1 | Q1 |
| S2 | Q2 |
| S3 | Q3 |
| S4 | Q4 |
| S5 | Q5 |
| S6 | Q6 |
| S7 | Q7 |
| S8 | Q8 |
| ... | ... |

| SESSION | QUOTA ($Q$) | EXPECTED QUOTA ($Qe$) | UPDATED QUOTA ($Q'$) | EXPECTED PROGRESS ($EP$) | SYNCING PROGRESS ($SP$) | SNAPSHOT DIFFERENTIAL ($SD$) | GROUP ($L$) |
|---|---|---|---|---|---|---|---|
| S1 | Q1 | Qe1 | Q1' | --- | --- | --- | L1 |
| S2 | Q2 | Qe2 | Q2' | --- | --- | --- | L1 |
| S3 | Q3 | Qe3 | Q3' | --- | --- | --- | L1 |
| S4 | Q4 | Qe4 | --- | EP4 | SP4 | SD4 | L2 |
| S5 | Q5 | Qe5 | Q4' | --- | --- | --- | L1 |
| S6 | Q6 | Qe6 | --- | EP6 | SP6 | SD6 | L2 |
| S7 | Q7 | Qe7 | --- | EP7 | SP7 | SD7 | L2 |
| S8 | Q8 | Qe8 | --- | EP8 | SP8 | SD8 | L2 |
| ... | ... | ... | ... | ... | ... | ... | ... |

FIG. 9

| SESSION | UPDATED QUOTA ($Q'$) | GROUP ($L$) |
|---|---|---|
| S1 | Q1' | L1 |
| S2 | Q2' | L1 |
| S3 | Q3' | L1 |
| S4 | Q4' | L2 |
| S5 | Q5' | L1 |
| S6 | Q6' | L2 |
| S7 | Q7 | L2 |
| S8 | Q8' | L2 |
| ... | ... | ... |

| SESSION | RPO (R) | SYNCING TIME (ST) | SYNC PROGRESS (SP) | SNAPSHOT DIFFERENTIAL (SD) |
|---|---|---|---|---|
| S1 | 300 | 60 | 42% | 15.59638 |
| S2 | 300 | 60 | 53% | 21.77111 |
| S3 | 300 | 60 | 14% | 36.86183 |
| S4 | 300 | 60 | 9% | 49.51387 |
| S5 | 300 | 60 | 7% | 74.23345 |
| S1 | 300 | 120 | 68% | 15.59638 |
| S2 | 300 | 120 | 73% | 21.77111 |
| S3 | 300 | 120 | 23% | 36.86183 |
| S4 | 300 | 120 | 15% | 49.51387 |
| S5 | 300 | 120 | 11% | 74.23345 |
| S1 | 300 | 180 | 98% | 15.59638 |
| S2 | 300 | 180 | 99% | 21.77111 |
| S3 | 300 | 180 | 35% | 36.86183 |
| S4 | 300 | 180 | 22% | 49.51387 |
| S5 | 300 | 180 | 17% | 74.23345 |
| S1 | 300 | 240 | 100% | 15.59638 |
| S2 | 300 | 240 | 100% | 21.77111 |
| S3 | 300 | 240 | 74% | 36.86183 |
| S4 | 300 | 240 | 50% | 49.51387 |
| S5 | 300 | 240 | 36% | 74.23345 |
| S1 | 300 | 300 | 100% | 15.59638 |
| S2 | 300 | 300 | 100% | 21.77111 |
| S3 | 300 | 300 | 95% | 36.86183 |
| S4 | 300 | 300 | 64% | 49.51387 |
| S5 | 300 | 300 | 47% | 74.23345 |

FIG. 15

| SESSION | SYNCING PROGRESS ($SP$) | EXPECTED PROGRESS ($EP$) | GROUP ($L$) |
|---|---|---|---|
| S1 | 42% | 20% | L1 |
| S2 | 53% | 20% | L1 |
| S3 | 14% | 20% | L2 |
| S4 | 9% | 20% | L2 |
| S5 | 7% | 20% | L2 |

| SESSION | QUOTA (Q) | UPDATED QUOTA (Q') |
|---|---|---|
| S1 | 6.55 | 3.23 |
| S2 | 11.54 | 4.58 |

FIG. 18

| SESSION | RPO (R) | SYNCING TIME (ST) | SYNC PROGRESS (SP) | SNAPSHOT DIFFERENTIAL (SD) | INITIAL QUOTA (Q) | UPDATED QUOTA (Q') |
|---|---|---|---|---|---|---|
| S1 | 300 | 60 | 42% | 15.59638 | 6.550478 | 3.226500413 |
| S2 | 300 | 60 | 53% | 21.77111 | 11.53869 | 4.57873665 |
| S3 | 300 | 60 | 14% | 36.86183 | 5.160656 | 15.4445855 |
| S4 | 300 | 60 | 9% | 49.51387 | 4.456248 | |
| S5 | 300 | 60 | 7% | 74.23345 | 5.196342 | |
| S1 | 300 | 120 | 47% | 15.59638 | 3.640779 | |
| S2 | 300 | 120 | 47% | 21.77111 | 5.119613 | |
| S3 | 300 | 120 | 51% | 36.86183 | 9.381075 | |
| S4 | 300 | 120 | 15% | 49.51387 | 3.71354 | |
| S5 | 300 | 120 | 11% | 74.23345 | 4.08284 | |
| S1 | 300 | 180 | 70% | 15.59638 | 3.640779 | |
| S2 | 300 | 180 | 71% | 21.77111 | 5.119613 | |
| S3 | 300 | 180 | 76% | 36.86183 | 9.381075 | |
| S4 | 300 | 180 | 22% | 49.51387 | 3.631017 | |
| S5 | 300 | 180 | 17% | 74.23345 | 4.206562 | |
| S1 | 300 | 240 | 93% | 15.59638 | 3.640779 | |
| S2 | 300 | 240 | 94% | 21.77111 | 5.119613 | |
| S3 | 300 | 240 | 100% | 36.86183 | 9.215457 | |
| S4 | 300 | 240 | 50% | 49.51387 | 6.189233 | |
| S5 | 300 | 240 | 36% | 74.23345 | 6.681011 | |
| S1 | 300 | 300 | 100% | 15.59638 | 3.119275 | |
| S2 | 300 | 300 | 100% | 21.77111 | 4.354222 | |
| S3 | 300 | 300 | 100% | 36.86183 | 7.372366 | |
| S4 | 300 | 300 | 64% | 49.51387 | 6.337775 | |
| S5 | 300 | 300 | 47% | 74.23345 | 6.977944 | |

FIG. 20

MANAGING BANDWIDTH QUOTAS FOR REPLICATION SESSIONS ESTABLISHED BETWEEN SOURCE AND DESTINATION STORAGE SYSTEMS

RELATED APPLICATION

The present application claims priority to Chinese Patent Application No. 202211554081.0, filed on Dec. 5, 2022 and entitled "Managing Bandwidth Quotas for Replication Sessions in Storage Systems," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input/output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for managing bandwidth quotas for replication sessions established between source and destination storage systems.

In one embodiment, an apparatus comprises at least one processing device comprising a processor coupled to a memory. The at least one processing device is configured to perform the step of determining a syncing progress metric for each of two or more replication sessions established between a source storage system and a destination storage system, each of the two or more replication sessions being associated with a recovery point objective and having an assigned bandwidth quota. The at least one processing device is also configured to perform the steps of identifying whether at least a first one of the two or more replication sessions is not expected to meet its associated first recovery point objective based at least in part on its determined first syncing progress metric and identifying whether at least a second one of the two or more replication sessions is expected to meet its associated second recovery point objective based at least in part on its determined second syncing progress metric. The at least one processing device is further configured to perform the step of, responsive to identifying the first and second replication sessions, updating a first assigned bandwidth quota for the first replication session and a second assigned bandwidth quota for the second replication session.

These and other illustrative embodiments include, without limitation, methods, apparatus, networks, systems and processor-readable storage media.

BRIEF DESCRIPTION OF THE DRAWINGS

FIG. 6 shows a table of information collected for different replication sessions during a monitoring interval in an illustrative embodiment.

FIG. 7 shows a table of initial quotas assigned to different replication sessions in an illustrative embodiment.

FIG. 9 shows a table of updates to quota values for replication sessions in a first group in an illustrative embodiment.

FIG. 13 shows another table of updated quotas for different replication sessions where one or more replication session quotas are unchanged in an illustrative embodiment.

FIG. 15 shows a table of various metrics collected for a set of replication sessions in an illustrative embodiment.

FIG. 16 shows a table of syncing progress and expected syncing progress for the set of replication sessions, along with group assignments for the set of replication sessions, in an illustrative embodiment.

FIG. 18 shows a table of quota and updated quota values for the set of replication sessions in an illustrative embodiment.

FIG. 20 shows a table of various metrics collected for the set of replication sessions, along with modifications to initial quota values for some of the replication sessions, in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
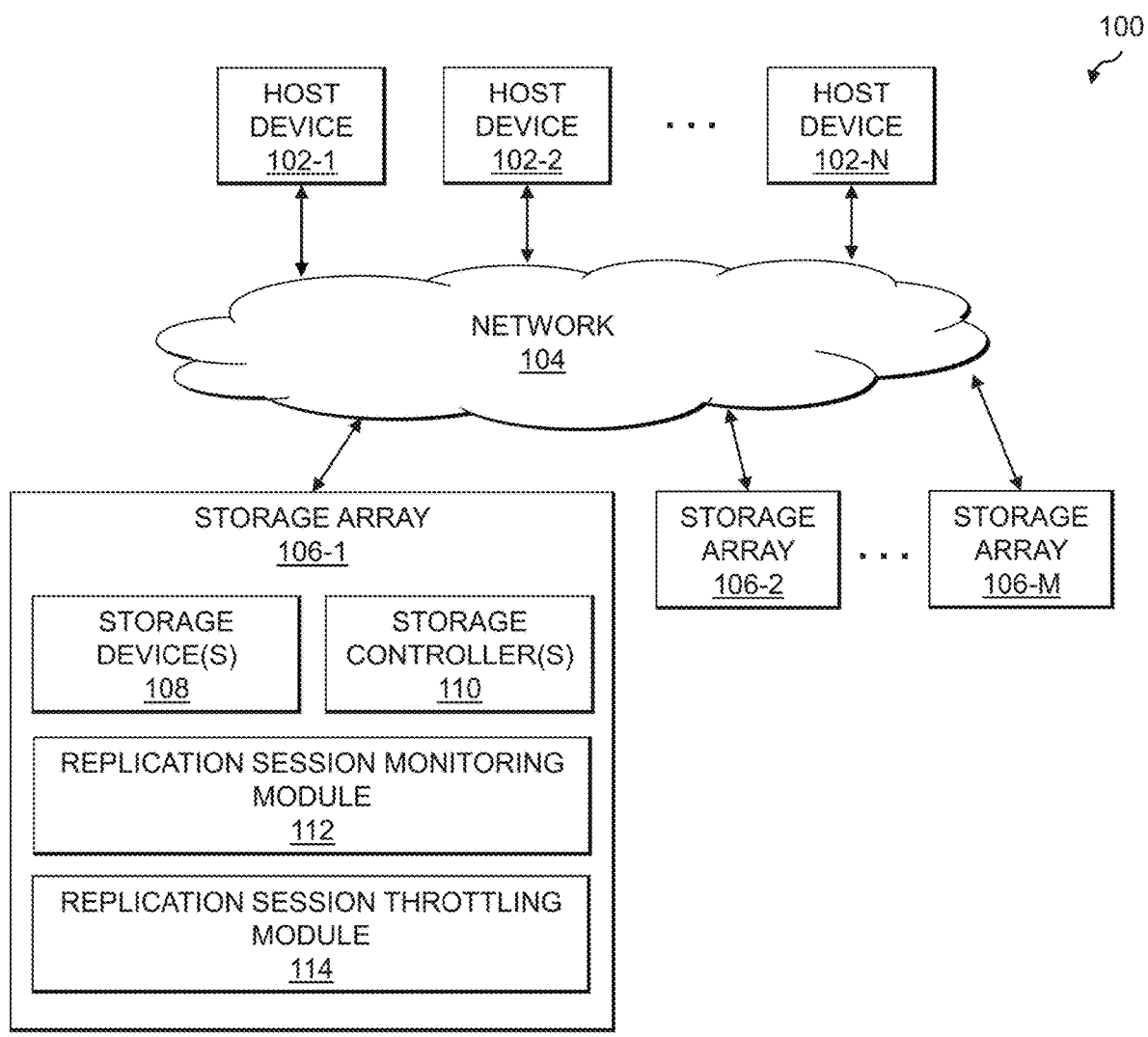
FIG. 1 is a block diagram of an information processing system configured for managing bandwidth quotas for replication sessions established between source and destination storage systems in an illustrative embodiment.

FIG. 1 shows an information processing system 100 configured in accordance with an illustrative embodiment to provide functionality for dynamically adjusting bandwidth that is allocated to different replication sessions. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (IO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input/output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations (e.g., as part of storage workloads of one or more applications running on the host devices 102) to be processed by the storage cluster.

In some embodiments, the storage cluster or at least one of the storage arrays 106 that are part of the storage cluster are assumed to provide functionality for data replication (e.g., between source and destination ones of the storage arrays 106, between a source one of the storage arrays 106 and an external destination such as cloud storage, etc.). At least one of the storage controllers of the storage arrays 106 (e.g., the storage controller 110 of storage array 106-1) is assumed to implement functionality for intelligently and dynamically controlling resources assigned to different replication sessions. Such functionality is provided via a replication session monitoring module 112 and a replication session throttling module 114.

The replication session monitoring module 112 is configured to determine syncing progress metrics for replication sessions established between a source (e.g., one or more of the storage devices 108 of the storage array 106-1) and a destination (e.g., one or more other ones of the storage devices 108 of the storage array 106-1, storage devices on one of the storage arrays 106-2 through 106-M, external storage such as cloud storage, etc.). Each of the replication sessions is associated with a recovery point objective and has an assigned bandwidth quota. The replication session monitoring module 112 is also configured to identify whether at least a first one of the replication sessions is not expected to meet its associated first recovery point objective based at least in part on its determined first syncing progress metric and, responsive to identifying that at least the first replication session is not expected to meet the first recovery point objective based at least in part on the first syncing progress metric, to identify whether at least a second one of the replication sessions is expected to meet its associated second recovery point objective based at least in part on its determined second syncing progress metric. The replication session throttling module 114 is configured responsive to identifying the first and second replication sessions, to update a first assigned bandwidth quota for the first replication session and a second assigned bandwidth quota for the second replication session.

Although in the FIG. 1 embodiment the replication session monitoring module 112 and the replication session throttling module 114 are shown as being implemented internal to the storage array 106-1 and outside the storage controllers 110, in other embodiments one or both of the replication session monitoring module 112 and the replication session throttling module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of one or both of the replication session monitoring module 112 and the replication session throttling module 114.

At least portions of the functionality of the replication session monitoring module 112 and the replication session throttling module 114 may be implemented at least in part in the form of software that is stored in memory and executed by a processor.

As noted above, the storage arrays 106 in some embodiments are assumed to be part of a storage cluster. The storage cluster is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks.

For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 21 and 22.

It is to be understood that the particular set of elements shown in FIG. 1 for managing bandwidth quotas for replication sessions established between source and destination storage systems is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for managing bandwidth quotas for replication sessions established between source and destination storage systems will now be described in more detail with reference to the flow diagram of FIG. 2. It is to be understood that this particular process is only an example, and that additional or alternative processes for managing bandwidth quotas for replication sessions established between source and destination storage systems may be used in other embodiments.

In this embodiment, the process includes steps 200 through 206. These steps are assumed to be performed by the replication session monitoring module 112 and the replication session throttling module 114. The process begins with step 200, determining a syncing progress metric for each of two or more replication sessions established between a source storage system and a destination storage system. Each of the two or more replication sessions is associated with a recovery point objective and has an assigned bandwidth quota. The assigned bandwidth quotas may be determined based at least in part on the syncing progress metrics, syncing times characterizing a length of time that each of the two or more replication sessions has been running, and a size of data to be replicated as part of the each of the two or more replication sessions.

The process continues with step 202, identifying whether at least a first one of the two or more replication sessions is not expected to meet its associated first recovery point objective based at least in part on its determined first syncing progress metric, and step 204, identifying whether at least a second one of the two or more replication sessions is expected to meet its associated second recovery point objective based at least in part on its determined second syncing progress metric. A first assigned bandwidth quota for the first replication session and a second assigned bandwidth quota for the second replication session are updated in step 206 responsive to identifying the first and second replication sessions. Step 206 may include increasing the first assigned bandwidth quota and decreasing the second assigned bandwidth quota.

Step 202 may include determining, based at least in part on the first recovery point objective, a first expected syncing progress metric for the first replication session, and comparing the first syncing progress metric to the first expected syncing progress metric. Determining the first expected syncing progress metric may further be based at least in part on a syncing time characterizing a length of time that the first replication session has been running.

Step 206 may comprise determining a first expected bandwidth quota for the first replication session and a second expected bandwidth quota for the second replication session. The first and second expected bandwidth quotas may be determined based at least in part on first and second sizes of data to be replicated as part of the first and second replication sessions and the first and second recovery point objectives of the first and second replication sessions. Updating the first bandwidth quota and the second bandwidth quota may comprise determining a permissible reduction in the second bandwidth quota based at least in part on the second expected bandwidth quota for the second replication session, and determining whether a magnitude of the permissible reduction in the second bandwidth quota is sufficient to raise the first bandwidth quota of the first replication session such that the first replication session will meet the first recovery point objective.

Updating the first bandwidth quota may comprise determining a magnitude of increase of the first bandwidth quota for the first replication session based at least in part on a first size of data to be replicated as part of the first replication session, and a difference between a first expected syncing progress metric of the first replication session and the first syncing progress metric of the first replication session. Determining the magnitude of the increase of the first bandwidth quota for the first replication session may be further based at least in part on a difference between a first expected bandwidth quota for the first replication session and the assigned first bandwidth quota for the first replication session.

Figure 2:
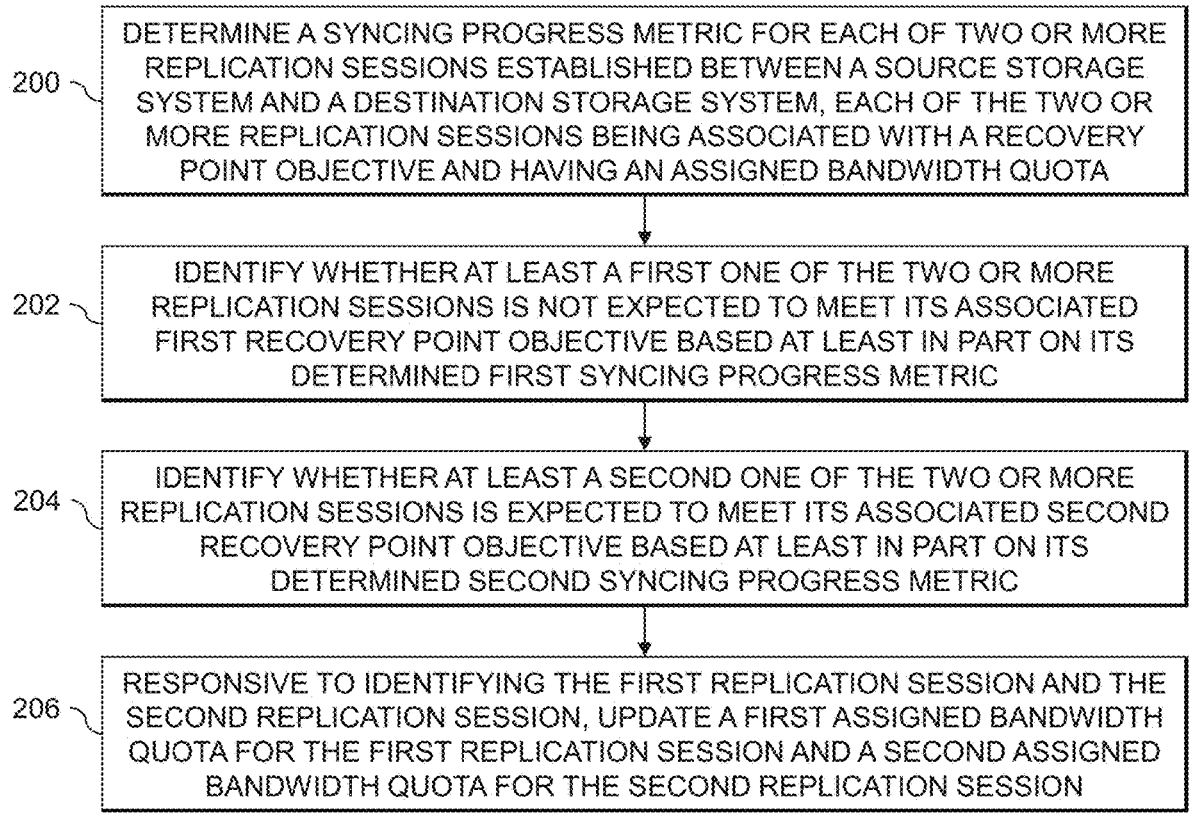
FIG. 2 is a flow diagram of an exemplary process for managing bandwidth quotas for replication sessions established between source and destination storage systems in an illustrative embodiment.

The FIG. 2 process may further include identifying (i) a first subset of the two or more replication sessions not expected to meet their associated recovery point objectives based at least in part on their determined syncing progress metrics and (ii) a second subset of the two or more replication sessions expected to meet their associated recovery point objectives based at least in part on their determined syncing progress metrics. The FIG. 2 process may also include determining whether a magnitude of permissible reduction in the assigned bandwidth quotas of replication sessions in the second subset is sufficient to raise the assigned bandwidth quotas of replication sessions in the first subset such that each of the replication sessions in the first subset will meet its associated recovery point objective. Responsive to determining that the magnitude of permissible reduction in the assigned bandwidth quotas of replication sessions in the second subset is sufficient to raise the assigned bandwidth quotas of replication sessions in the first subset such that each of the replication sessions in the first subset will meet its associated recovery point objective, the bandwidth quotas assigned to each of the replication sessions in the first subset are updated. Responsive to determining that the magnitude of permissible reduction in the assigned bandwidth quotas of replication sessions in the second subset is not sufficient to raise the assigned bandwidth quotas of replication sessions in the first subset such that each of the replication sessions in the first subset will meet its associated recovery point objective, a sorting of the replication sessions in the first subset is determined according to updates of assigned bandwidth quotas needed for meeting their associated recovery point objectives. A subset of the replication sessions in the first subset are selected based at least in part on the determined sorting and the magnitude of permissible reduction in the assigned bandwidth quotas of the replication sessions in the second subset, and the bandwidth quotas assigned to the selected subset of the replication sessions in the first subset are updated.

Data replication is one of many data protection technologies that enable a data center or other computing environment to avoid disruptions to operation (e.g., business operations). Data replication may support asynchronous and synchronous modes. In the asynchronous mode, a user may manually set a Recovery Point Objective (RPO) value in which the user desires data between a source and a destination (e.g., source and destination storage arrays) to synchronize automatically.

Data synchronization may utilize multiple replication sessions each associated with its own session identifier (ID). Each session ID may be configured with its own transport mechanism, which do not affect each other. When there are many replication sessions configured on a storage system with high load, some of the replication sessions may not be able to complete data synchronization within their defined RPOs, which will cause such replication sessions to miss the next data synchronization. Illustrative embodiments provide technical solutions for adjusting the bandwidth assigned to different replication sessions dynamically, to ensure that as many of the replication sessions as possible complete data synchronization tasks within their defined RPOs. In some embodiments, the technical solutions adjust replication session data transfer rates. The technical solutions aim to classify all replication sessions according to the state of the replication sessions, and then execute different policies (e.g., throttling policies) on the replication sessions based on the different classifications so that the replication sessions are better balanced.

Asynchronous replication sessions enable users to replicate data from a source to a destination (e.g., a source storage array and a destination storage array), when RPOs are triggered, to transfer delta data (e.g., changed data since a last replication session). In some scenarios, a user may configure many different replication sessions on a system leading to situations in which some of the replication sessions cannot complete data synchronization within the RPOs leading to various technical problems. When a replication session fails to complete data synchronization within its RPO, the next RPO will be skipped and the user is then at risk of losing data protection against the expected RPO time. When the synchronization time takes too long to finish, it may hang the replication sessions bringing negative impacts to the system such as blocking high availability (HA) functions and non-disruptive upgrades. Hanged replication sessions are accumulative. Once there is a replication session which has missed its RPO, it may queue other replication sessions because of its high bandwidth demand. When the hanged replication sessions situation gets worse, it is hard to resolve the problem without requiring expensive manual effort (e.g., of support engineers) which adds cost and risk to end-users.

Figure 3:
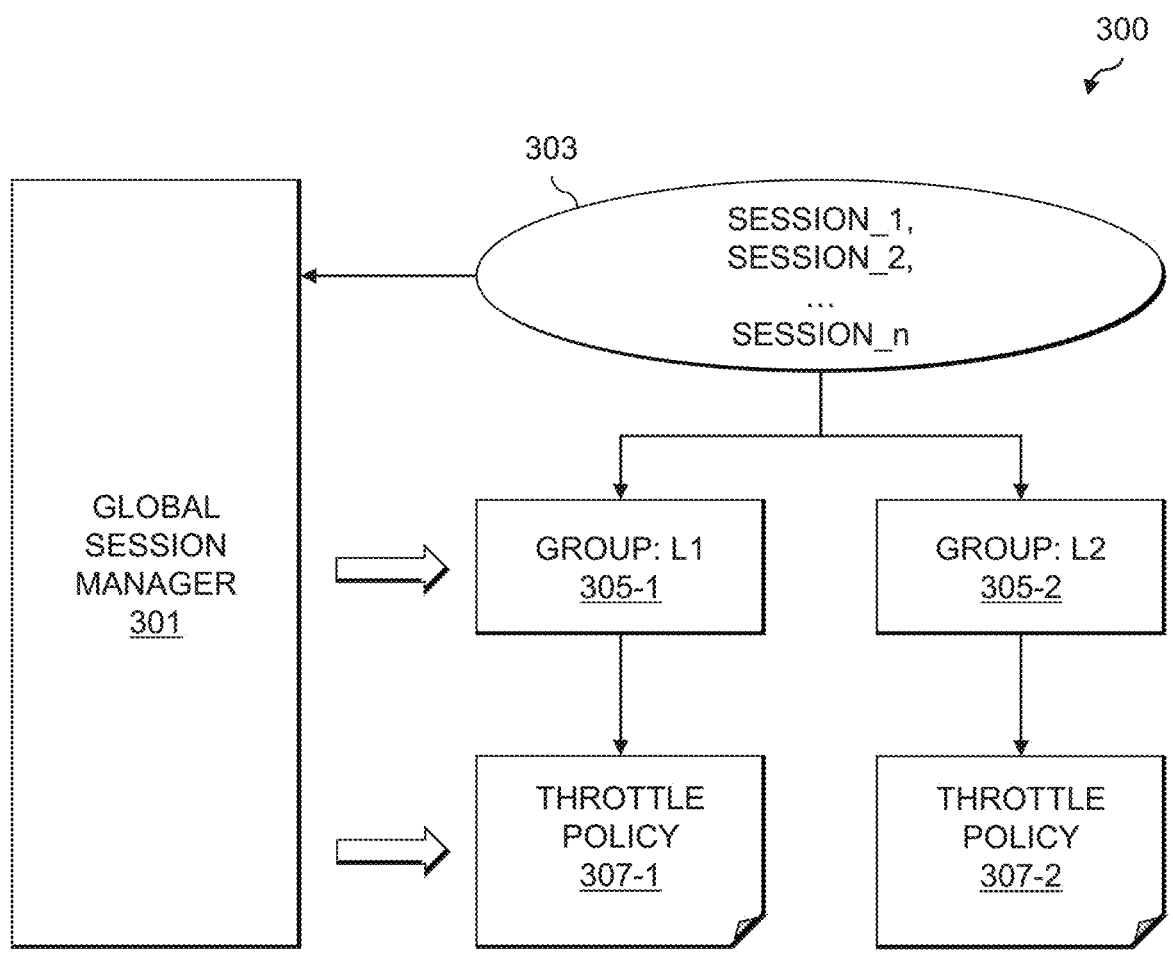
FIG. 3 shows a system including a global session manager which monitors and applies throttling policies for different groups of replication sessions in an illustrative embodiment.

The technical solutions described herein provide functionality for monitoring the status of replication sessions and dynamically adjusting the transfer rate of each replication session based at least in part on such monitoring. Replication sessions that occupy a high bandwidth may be throttled to improve overall replication transfer efficiency. In some embodiments, a global replication manager is used to manage all replication sessions. The global replication manager is configured to select suitable replication sessions to throttle, and to determine suitable throttling policies. FIG. 3 shows a system 300 including a global session manager 301 which monitors the status of each replication session in a set of replication sessions 303 (e.g., denoted session_1, session_2, . . . session n). Monitoring the status of the replication sessions 303 may include monitoring each replication session's data transmission at regular intervals. According to the monitored status, the global session manager 301 divides the replication sessions 303 into two levels or groups 305-1 (e.g., group L1) and 305-2 (e.g., group L2). Each of the groups 305-1 and 305-2 will adjust its delta synchronization according to its own throttling policy 307-1 and 307-2.

Figure 4:
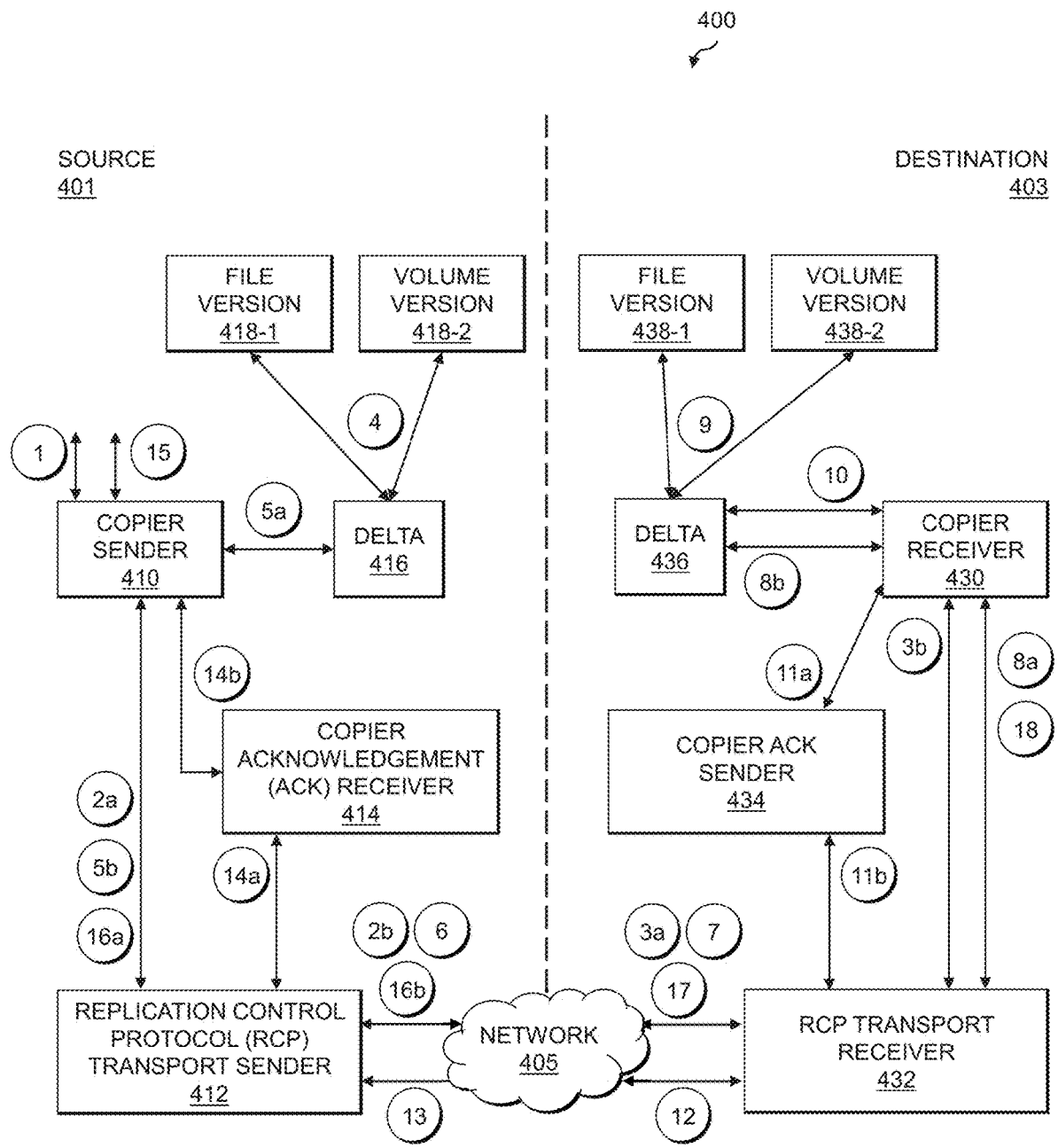
FIG. 4 shows a process flow for asynchronous data replication between a source and destination in an illustrative embodiment.

FIG. 4 shows a system flow 400 for replication data transfer at a source 401 and destination 403. The source 401 includes a copier sender component 410, a replication control protocol (RCP) transport sender component 412, and a copier acknowledgement (ACK) receiver component 414. The destination 403 includes a copier receiver component 430, an RCP transport receiver component 432, and a copier ACK sender component 434. The RCP transport sender component 412 and the RCP transport receiver component 432 are coupled via a network 405. The copier sender component 410 in step 1 may receive a request to initiate asynchronous replication from the source 401 to the destination 403. The copier sender component 410 in step 2a instructs the RCP transport sender component 412 to initiate one or more replication sessions. In steps 2b and 3a, the RCP transport sender component 412 and the RCP transport receiver component 432 communicate over network 405 to establish the one or more replication sessions. In step 3b, the RCP transport receiver component 432 instructs the copier receiver component 430 of the established one or more replication sessions. In step 4, a delta 416 at the source 401 is generated using file version information 418-1 and volume version information 418-2. The copier sender component 410 in step 5a obtains the delta 416, and then forwards the delta 416 to the RCP transport sender component in step 5b. In steps 6 and 7, the delta 416 is communicated between the RCP transport sender component 412 and the RCP transport receiver component 432 over the network 405.

In step 8a, the RCP transport receiver component 432 sends the delta 416 to the copier receiver component 430, and in step 8b the copier receiver component 430 saves the delta 416 as delta 436. The delta 436 populates file version information 438-1 and volume version information 438-2 in step 9. The delta 436 then confirms to the copier receiver component 430 in step 10, with the copier receiver component 430 instructing the copier ACK sender component 434 in step 11a to provide an acknowledgment. The copier ACK sender component 434 provides the acknowledgement to the RCP transport receiver component 432 in step 11b. The RCP transport receiver component 432 provides the acknowledgment to the RCP transport sender in steps 12 and 13 through communication over the network 405. The RCP transport sender component 412 forwards the acknowledgement to the copier ACK receiver component 414 in step 14a, which then confirms completion to the copier sender component 410 in step 14b. The copier sender component 410 can then in step 15 indicate that the replication session is completed (e.g., that the delta 416 was successfully transferred from the source 401 to the delta 436 at the destination 403). The copier sender component 410 can then indicate that the replication session is completed to the copier receiver component 430 through communications with the RCP transport sender component 412 and the RCP transport receiver component 432 in steps 16a, 16b, 17 and 18.

Each replication session may have its own copier sender component 410 which is responsible for reading data from a message queue and putting it into the stream. The technical solutions described herein can limit the amount of data for each copier sender component process within some designated time interval in order to limit the speed of replication sessions (e.g., to set quotas during copier sending).

In an interval T, the total data of the entire system in data synchronization is equal to the sum of the data in all n replication sessions:

$$D_{total}=S1+S2+S3+ \ldots Sn$$

Figure 5:
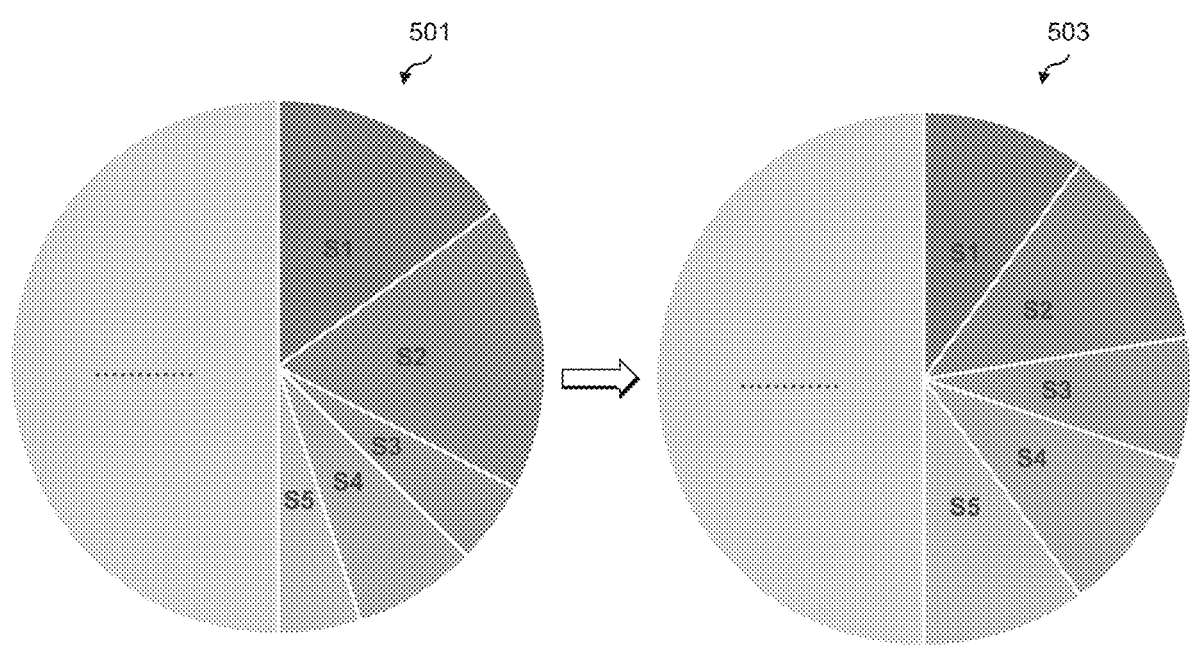
FIG. 5 shows charts of data allocated to different replication sessions before and after throttling in an illustrative embodiment.

This is illustrated in FIG. 5, which shows in chart 501 how different ones of the replication sessions have different amounts of data to be synchronized. The chart 503 shows how different ones of the replication sessions may be throttled or limited. If there is a situation that some replication sessions cannot complete data transmission, it means that $D_{total}$ has reached a limit value. At this time, the technical solutions can limit some of the replication sessions (e.g., such as replication session S1 which uses less data in chart 503 than in chart 501).

When an interval T is reached, various information may be collected for each replication session. FIG. 6 shows a table 600 illustrating information which may be collected for the replication sessions when the interval T is reached, such as RPO (R), syncing time (ST), syncing progress (SP), and snapshot differential (SD). In an initial state, the quota for each replication session will have an initial value that is calculated by the historical average bandwidth multiplied by T:

$$Q = \frac{SP \times SD}{ST} \times T$$

FIG. 7 shows a table 700 showing different initial quotas (Q) assigned to the different replication sessions. The quota (Q) set for a replication session is used to limit the transfer speed of that replication session. The snapshot differential (SD) is the delta data between the source and destination. The syncing time (ST) refers to the time consumed by the current transfer process.

Ideally, it is expected that each replication session will complete data synchronization of its delta at its RPO, which is represented as an expected syncing progress (EP), calculated according to:

$$EP=ST \div R \times 100\%$$

A replication session's actual syncing progress (SP) may be higher or lower than its expected syncing progress (EP). The replication sessions are assigned to different levels or groups according to comparisons between the actual syncing progress and expected syncing progress according to:

$$\text{Group} = \begin{cases} L1(SP \geq EP) \\ L2(SP < EP) \end{cases}$$

Figure 8:
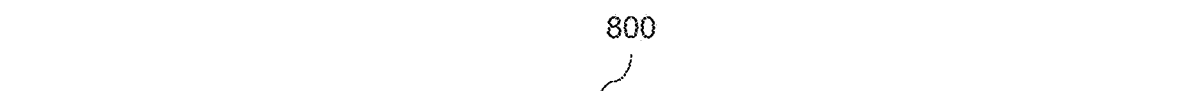
FIG. 8 shows a table of group assignments for replication sessions in an illustrative embodiment.

After such calculations, the replication sessions will be divided into two groups (L) denoted L1 and L2. FIG. 8 shows a table 800 illustrating the assignment of replication sessions to the groups (L). It should be noted that while FIG. 8 shows an example where the replication sessions are assigned to one of two different groups, it should be appreciated that in other embodiments replication sessions may be assigned to one of three or more different groups. Different throttling logic may be applied to replication sessions in each of the different groups.

Once all replication sessions are divided into groups (e.g., the groups L1 and L2), different scenarios may be considered. In a first scenario, the L2 group is empty and the global session manager 301 determines that, at a current time, there is no risk for any of the replication sessions to not complete data synchronization within their designated RPOs and no throttling will be done. In a second scenario, the L2 group is not empty but the L1 group is empty, meaning that there is a risk that all replication sessions will not complete data synchronization within their designated RPOs. In the second scenario, there are no "extra" replication sessions (e.g., replication sessions in the L1 group expected to meet their RPOs) which may be throttled such that no throttling may be done. In a third scenario, the L2 and L1 groups are not empty. In the third scenario, there are replication sessions at risk of not completing data synchronization within their designated RPOs (e.g., the replication sessions in group L2). Since the group L1 is not empty, the technical solutions described herein consider throttling one or more of the sessions in the group L1 to allow more bandwidth for one or more of the replication sessions in group L2.

In the third scenario, limiting the quota of a replication session to enforce throttling may proceed as follows. The L2 session's new quota value is calculated, and a determination is made as to whether an L1 session needs to be limited. For L1 and L2 replication sessions, each has an expected quota value, $Q_{expected}$ (also referred to as Qe), which may be determined according to:

$$Q_{expected} = SD \times \frac{T}{RPO}$$

For L1 replication sessions, the final or updated quota (Q') values should not be set lower than that needed to ensure that such replication sessions do not miss their associated RPOs. Thus, the final or updated quota (Q') value may be determined according to:

$$Q' = Q_{expected} + (Q - Q_{expected}) \times \frac{1}{2}$$

After a first round of quota updates, the new quota values for L1 sessions are determined as shown in table 900 of FIG. 9.

Figure 10:
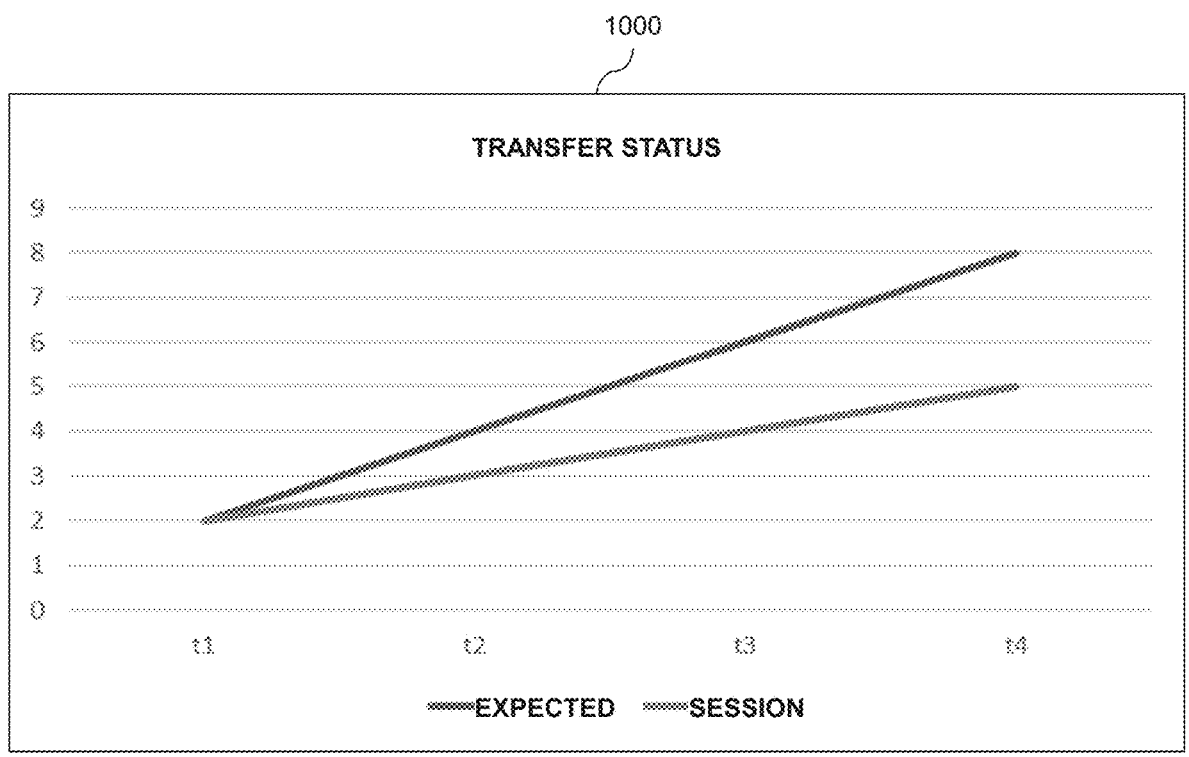
FIG. 10 shows a plot of actual and expected data transmission for a replication session over time in an illustrative embodiment.
Figure 11:
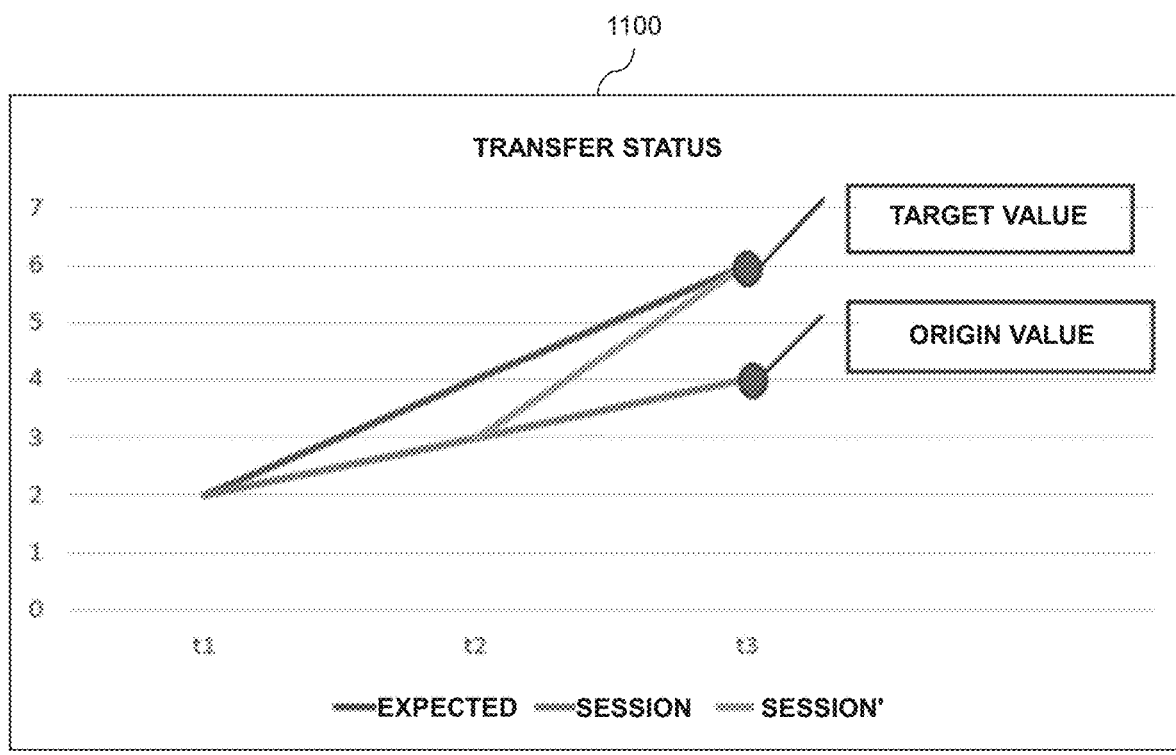
FIG. 11 shows a plot of the actual and expected data transmission for a replication session over time, as well as a change in the data transmission quota needed for the actual data transmission to reach the expected data transmission at a given point in time in an illustrative embodiment.

After the first round of quota updates, an evaluation is performed to determine whether any of the replication sessions in the L2 group can be improved to its expected syncing progress (EP) value after the quota reduction of one or more of the replication sessions in the L1 group. Assume that there is an asynchronous replication session monitored by the global session manager 301, with transferred data and cost plotted as a function of time as shown in the plot 1000 of FIG. 10. The "expected" line is the ideal transmission within the RPO, while the "session" line is the actual data transmitted. When considering increasing the transmission speed of the replication session to the ideal state, a determination is made as to how much data (e.g., quota increase) transfer is needed to make that replication session reach the ideal "expected" line so that in the next interval its line trend will be like the session' as shown in the plot 1100 of FIG. 11. From the plot 1100, it can be seen that the (target value−origin value) is the replication session's next interval needed quota, which may be calculated according to:

$$\Delta S = \frac{SD}{RPO} \times (ST + T) - \left(SD \times SP + \frac{SD \times SP \times T}{ST}\right)$$

$$\Delta S = \frac{SD \times ST}{RPO} - SD \times SP + \frac{SD}{RPO} \times T - \frac{SD \times SP \times T}{ST}$$

$$\Delta S = SD \times (EP - SP) + Q_e - Q$$

The total number of extra quotas, ΔL1, and L2 replication sessions' expected "need" quota (e.g., for reaching expected syncing progress in order to meet RPOs), ΔL2, may be determined according to:

$$\Delta L1 = (Q1 - Q1') + (Q2 - Q2') + (Q3 - Q3') + (Q4 - Q4') + \ldots$$

$$\Delta L2 = \Delta S4 + \Delta S6 + \Delta S7 + \Delta S8 + \ldots$$

The ΔL1 and ΔL2 values are then compared. If ΔL1>ΔL2, the L1 final quota will be set as Q', and the L2 final quota will be set to:

$$Q' = (\Delta Si) \times \frac{\Delta L1}{\Delta L2} + Q$$

Figure 12:
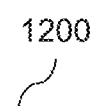
FIG. 12 shows a table of updated quotas for different replication sessions in an illustrative embodiment.

The Q' may continue to be updated according to the above equations in multiple rounds. FIG. 12 shows a table 1200 of updated quotas. If the above steps are run for many rounds (e.g., n rounds), then for each replication session in group L1, its final updated quota will be determined according to:

$$Q' = Q_{expected} + (Q - Q_{expected}) \times \frac{1}{2}^n$$

It is desired for Q' not to drop to a small value which may cause a replication session to jump repeatedly between the L1 and L2 groups. Therefore, when the condition ΔL1>ΔL2 is still not met after the replication session has been updated a designated threshold number of times (e.g., five times), processing will proceed as described below.

If ΔL1<ΔL2 after updating the designated threshold number of times (e.g., five times), there will be some replication sessions in group L2 that cannot obtain enough quota. In this scenario, a decision may be made to speed up replication sessions in group L2 which have less remaining RPO time. A sorted list of replication sessions in the group L2 will be obtained. A new sorted replication session list is:

$$\text{SessionList}_{sort} = [S6, S4, S8, S7 \ldots]$$

Then, ΔL2 is calculated according to the sorted list to meet ΔL1>ΔL2. This time, a new replication session list that meets the ΔL1>ΔL2 condition is obtained as shown below:

$$\begin{cases} SessionList_{new} = [S6, S4, S8 \ldots ](\Delta S6 + \Delta S4 + \Delta S8 + \ldots < \Delta L1, i = 6, 4, 8, 7 \ldots) \\ SessionList_{remain} = SessionList_{sort} - SeessionList_{new} \end{cases}$$

Thus, the new $\Delta L2' = \Sigma \Delta Si$, $Si \in SessionList_{new}$). This time, the L1 group quota will be set to Q', and $SessionList_{new}$ quota will be set to:

$$Q' = (\Delta Si) \times \frac{\Delta L1}{\Delta L2'} + Q$$

$SessionList_{remain}$ will keep the initial quota unchanged as shown in table 1300 of FIG. 13 (e.g., where session S7's Q' value is unchanged).

Figure 14A:
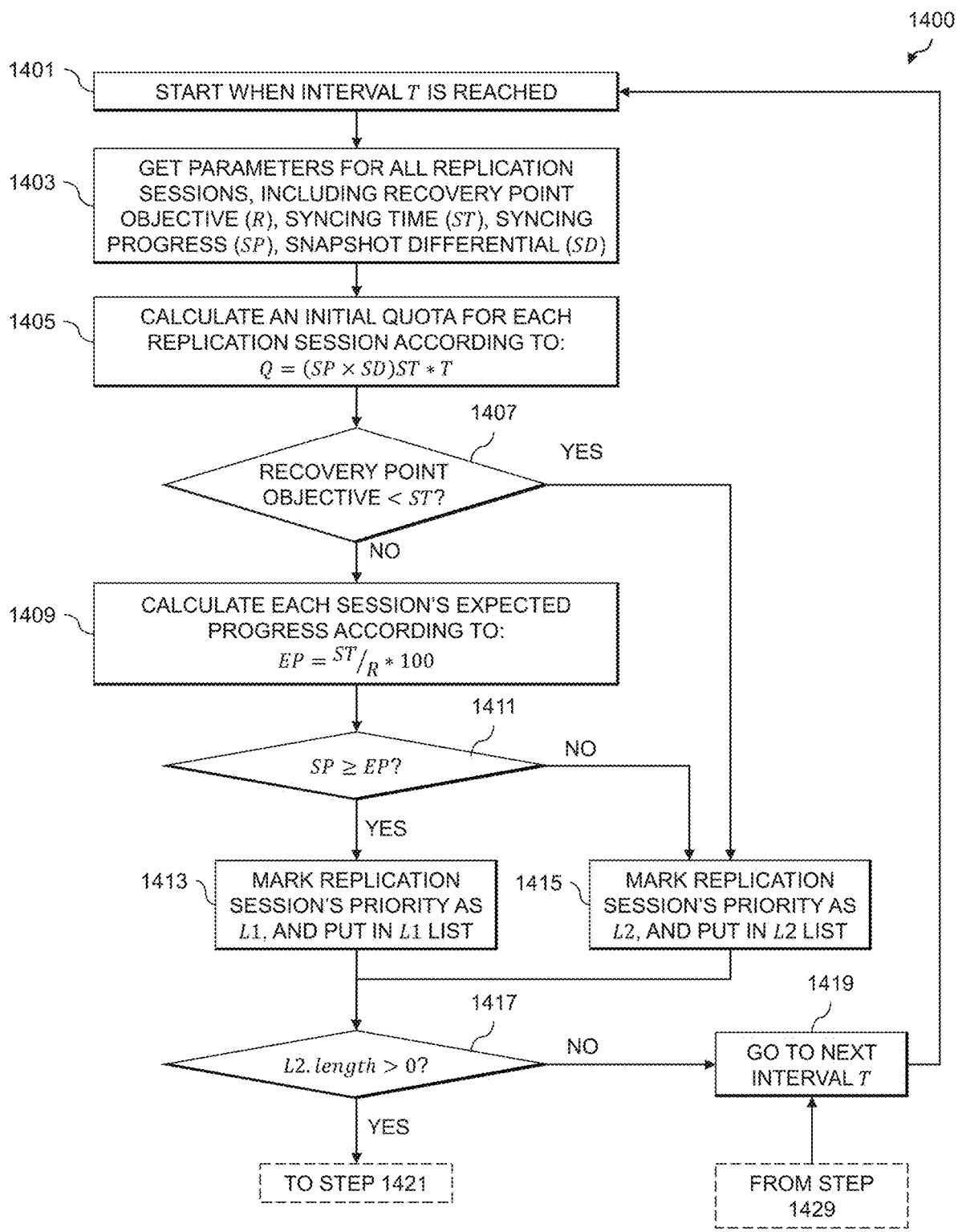
FIGS. 14A and 14B show a process flow for determining quotas for different replication sessions in an illustrative embodiment.
Figure 14B:
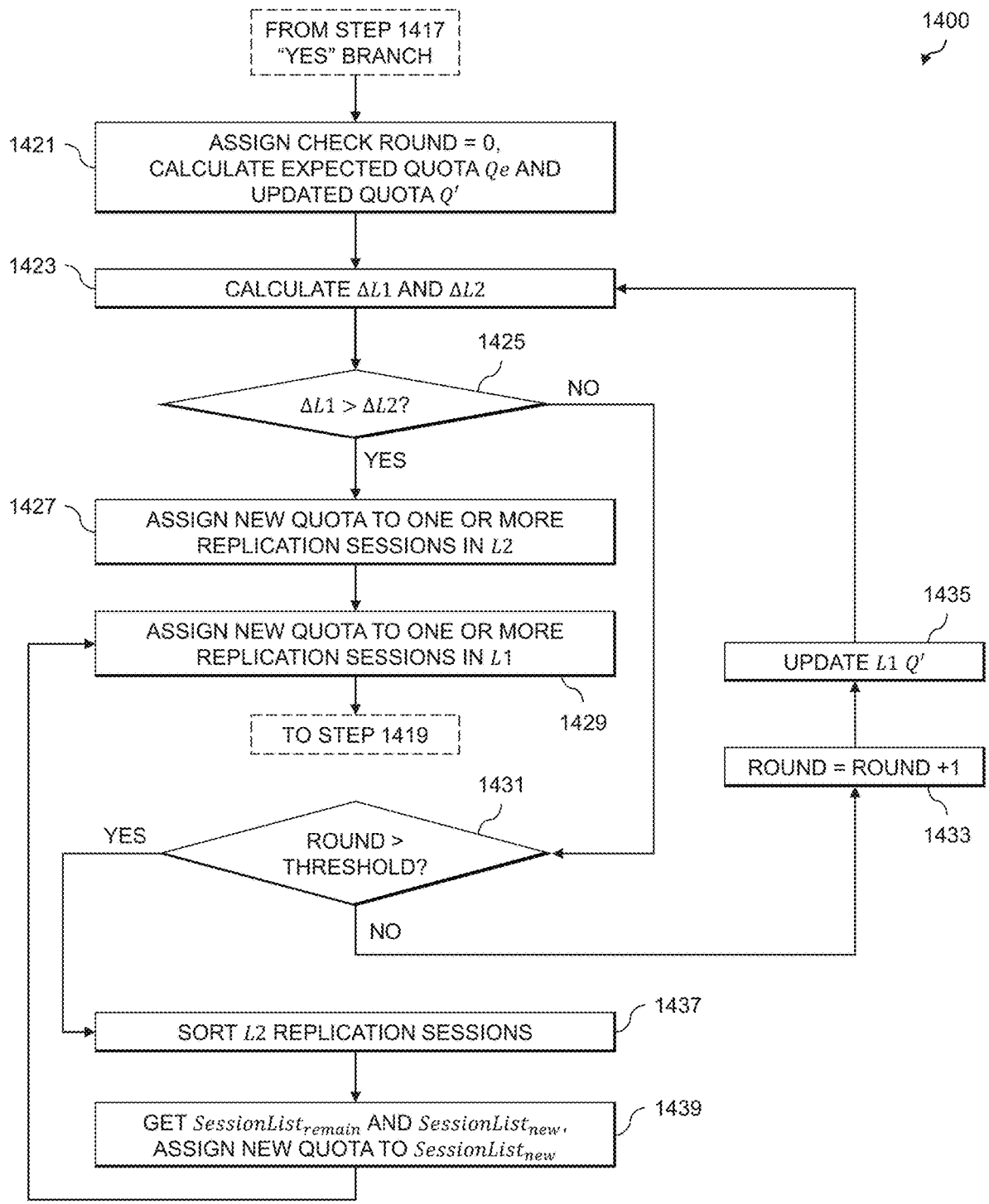

FIGS. 14A and 14B show a process flow 1400 for determining quotas for replication sessions. The process flow 1400, as shown in FIG. 14A, starts in step 1401 when an interval T is reached. In step 1403, parameters for all replication sessions are obtained. Such parameters may include RPO (R), syncing time (ST), syncing progress (SP), and snapshot differential (SD). An initial quota for each replication session is calculated in step 1405, according to:

$$Q = (SP \times SD)ST*T$$

In step 1407, a determination is made as to whether the RPO (R) for the replication sessions are less than the syncing time (ST) for the replication sessions.

If the result of the step 1407 determination is no, the process flow 1400 proceeds to step 1409 where an expected syncing progress (EP) is calculated for each replication session whose RPO value (R) is less than its syncing time (ST). In step 1411, a determination is made as to whether each of the replication sessions have a syncing progress (SP) that is greater than or equal to the expected syncing progress (EP). If the result of the step 1411 determination is yes for a replication session, that replication session is marked as priority L1 and is put in the L1 list or group in step 1413. If the result of the step 1407 determination is yes for a replication session, or if the result of the step 1411 determination is no for a replication session, that replication session is marked as priority L2 and is put in the L2 list or group in step 1415.

In step 1417, a determination is made as to whether the length of the L2 group or list is greater than zero (e.g., whether the L2 group or list is empty or not). If the result of the step 1417 determination is no, the process flow 1400 proceeds to step 1419 where a next interval T is entered and the process flow 1400 then returns to step 1401. If the result of the step 1417 determination is yes, the process flow 1400 proceeds to step 1421 as shown in FIG. 14B.

In step 1421, a check round of 0 is assigned, and expected quota (Qe) and updated quota (Q') values are calculated for the replication sessions. ΔL1 and ΔL2 values are calculated in step 1423. In step 1425, a determination is made as to whether ΔL1 is greater than ΔL2. If the result of the step 1425 determination is yes, the process flow 1400 proceeds to step 1427 where a new quota is assigned to one or more replication sessions in the L2 group. A new quota is assigned to one or more replication sessions in the L1 group in step 1429. Following step 1429, the process flow returns to step 1419 as shown in FIG. 14A.

If the result of the step 1425 determination is no, the process flow 1400 proceeds to step 1431 where a determination is made as to whether the current round is greater than a designated threshold (e.g., five rounds). If the result of the step 1431 determination is no, the process flow 1400 proceeds to step 1433 where the value of round is incremented by one. In step 1435, the quota values (Q') for the replication sessions in the L1 group are updated. The process flow 1400 then returns to step 1423. If the result of the step 1431 determination is yes, the process flow 1400 proceeds to step 1437 where the replication sessions in the L2 group are sorted. In step 1439, $SessionList_{remain}$ and $SessionList_{new}$ are determined, and new quotas are assigned to the replication sessions in $SessionList_{new}$. Following step 1439, the process flow 1400 returns to step 1429.

The technical solutions described herein enable the bandwidth of asynchronous replication sessions to be shared and balanced in real time to reduce the risk of replication sessions hanging. In some embodiments, a log of previous asynchronous replication sessions' data transfer performance is used to give customized quotas for replication sessions. The technical solutions also provide functionality for choosing the best candidate replication sessions to achieve the goal of having the greatest number of replication sessions syncing up with their RPOs under limited bandwidth resources.

FIG. 15 shows a table 1500 illustrating various metrics (e.g., RPO (R), syncing time (ST), syncing progress (SP) and snapshot differential (SD)) for a set of replication sessions S1 through S5 at each 60 seconds, of which the RPO is five minutes or 300 seconds. With a conventional approach as shown in the table 1500, only two replication sessions (S1 and S2) will sync up within five minutes. The replication sessions S3, S4 and S5 will not sync up within five minutes. FIG. 16 shows a table 1600 of syncing progress (SP), expected syncing progress (EP) and group (L) metrics for the replication sessions S1 through S5 at the synchronization time of 60 seconds. At the sixty second time interval, the replication sessions S1 and S2 have syncing progress (SP) values that exceed the expected syncing progress (EP) of 20% and are thus assigned to group L1, while the replication sessions S3, S4 and S5 have syncing progress (SP) values less than the expected syncing progress (EP) of 20% and are thus assigned to group L2.

Figure 17:
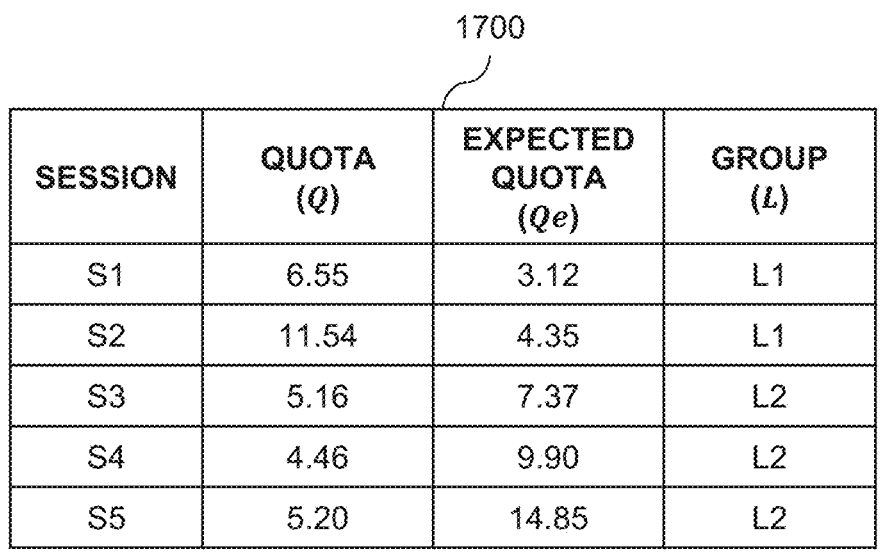
FIG. 17 shows a table of quota and expected quota values for the set of replication sessions in an illustrative embodiment.

The needed quotas for replication sessions in the L1 and L2 groups are then calculated to see if performing throttling will result in more of the replication sessions in the L2 group meeting their RPOs. The table 1700 of FIG. 17 shows the quota (Q) and expected quota (Qe) values for each of the replication sessions S1 through S5. The L2 needed quota value is calculated according to:

$$\Delta S3 = 36.86 \times (20\% - 14\%) + (7.37 - 5.16) = 4.42$$

$$\Delta S4 = 49.51 \times (20\% - 9\%) + (9.90 - 4.46) = 10.89$$

$$\Delta S5 = 36.86 \times (20\% - 14\%) + (7.37 - 5.16) = 19.30$$

$$\Delta L2 = \Delta S3 + \Delta S4 + \Delta S5 = 34.62$$

For L1 extra quota, after updating the L1 group quota for the designated threshold number of rounds (e.g., five rounds), the quota (Q) and updated quota (Q') values are shown in the table 1800 of FIG. 18. The final ΔL1 is also less than ΔL2:

$$\Delta L1 = (6.55 - 3.23) + (11.54 - 4.58) = 10.28$$

All replication sessions are then sorted according to their needed quota to calculate a new ΔL2' to meet the condition that ΔL1>ΔL2'. Here, the new ΔL2' is calculated as:

$$\Delta L2' = \Delta S3 = 4.42 < 10.28$$

The replication session S3's final updated quota (Q') will then be set as:

$$Q' = (4.42) \times \frac{10.28}{4.42} + 5.16 = 15.44$$

Figure 19:
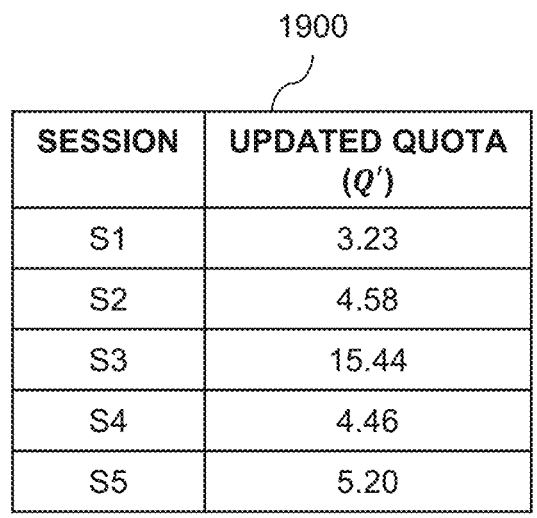
FIG. 19 shows a table of updated quota values for each of the replication sessions in an illustrative embodiment.

FIG. 19 shows a table 1900 with updated quota (Q') values for each of the replication sessions S1 through S5. Here, the first quota adjustment is complete. At a following interval, after calculating, there is no additional replication session throttling needed to meet the condition ΔL1>ΔL2, so nothing is done. FIG. 20 shows a table 2000 of the final transfer status after adjustment using the process flow 1400 of FIGS. 14A and 14B. The sync speed is changed and impacted by network conditions. The replication sessions' sync quota may be adjusted based on real-time sync status. Using the techniques described herein, as shown in the table 2000 of FIG. 20, there are three sessions (S1, S2 and S3) that are able to complete data synchronization within the RPO as compared with two sessions (S1 and S2) using a conventional approach as illustrated in the table 1500 of FIG. 15.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for managing bandwidth quotas for replication sessions established between source and destination storage systems will now be described in greater detail with reference to FIGS. 21 and 22. Although described in the context of system 100, these platforms may also be used to implement at least portions of other information processing systems in other embodiments.

Figure 21:
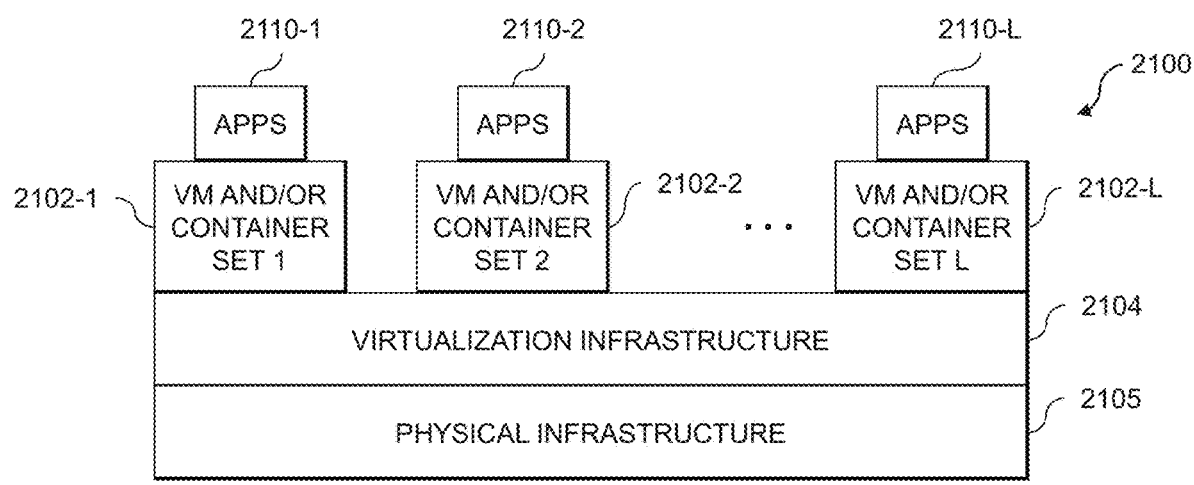
FIGS. 21 and 22 show examples of processing platforms that may be utilized to implement at least a portion of an information processing system in illustrative embodiments.
Figure 22:
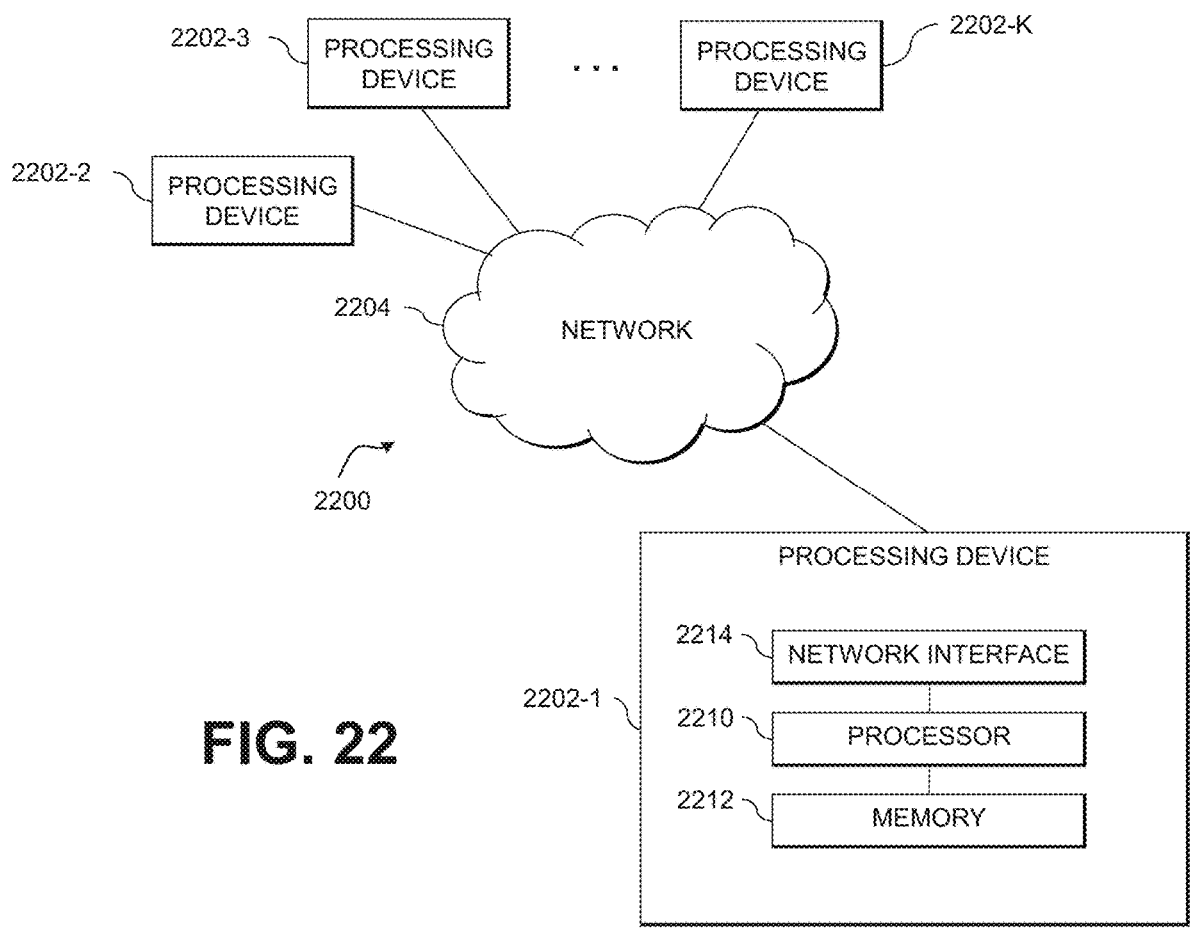

FIG. 21 shows an example processing platform comprising cloud infrastructure 2100. The cloud infrastructure 2100 comprises a combination of physical and virtual processing resources that may be utilized to implement at least a portion of the information processing system 100 in FIG. 1. The cloud infrastructure 2100 comprises multiple virtual machines (VMs) and/or container sets 2102-1, 2102-2, . . . 2102-L implemented using virtualization infrastructure 2104. The virtualization infrastructure 2104 runs on physical infrastructure 2105, and illustratively comprises one or more hypervisors and/or operating system level virtualization infrastructure. The operating system level virtualization infrastructure illustratively comprises kernel control groups of a Linux operating system or other type of operating system.

The cloud infrastructure 2100 further comprises sets of applications 2110-1, 2110-2, . . . 2110-L running on respective ones of the VMs/container sets 2102-1, 2102-2, . . . 2102-L under the control of the virtualization infrastructure 2104. The VMs/container sets 2102 may comprise respective VMs, respective sets of one or more containers, or respective sets of one or more containers running in VMs.

In some implementations of the FIG. 21 embodiment, the VMs/container sets 2102 comprise respective VMs implemented using virtualization infrastructure 2104 that comprises at least one hypervisor. A hypervisor platform may be used to implement a hypervisor within the virtualization infrastructure 2104, where the hypervisor platform has an associated virtual infrastructure management system. The underlying physical machines may comprise one or more distributed processing platforms that include one or more storage systems.

In other implementations of the FIG. 21 embodiment, the VMs/container sets 2102 comprise respective containers implemented using virtualization infrastructure 2104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2100 shown in FIG. 21 may represent at least a portion of one processing platform. Another example of such a processing platform is processing platform 2200 shown in FIG. 22.

The processing platform 2200 in this embodiment comprises a portion of system 100 and includes a plurality of processing devices, denoted 2202-1, 2202-2, 2202-3, . . . 2202-K, which communicate with one another over a network 2204.

The network 2204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2202-1 in the processing platform 2200 comprises a processor 2210 coupled to a memory 2212.

The processor 2210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2212 may comprise random access memory (RAM), read-only memory (ROM), flash memory or other types of memory, in any combination. The memory 2212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2202-1 is network interface circuitry 2214, which is used to interface the processing device with the network 2204 and other system components, and may comprise conventional transceivers.

The other processing devices 2202 of the processing platform 2200 are assumed to be configured in a manner similar to that shown for processing device 2202-1 in the figure.

Again, the particular processing platform 2200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing bandwidth quotas for replication sessions established between source and destination storage systems as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      determining a syncing progress metric for each of two or more replication sessions established between a source storage system and a destination storage system, each of the two or more replication sessions being associated with a recovery point objective and having an assigned bandwidth quota;
      identifying whether at least a first one of the two or more replication sessions is not expected to meet its associated first recovery point objective based at least in part on its determined first syncing progress metric;
      identifying whether at least a second one of the two or more replication sessions is expected to meet its associated second recovery point objective based at least in part on its determined second syncing progress metric; and
      responsive to (i) identifying that the first replication session is not expected to meet its associated first recovery point objective and (ii) identifying that the second replication session is expected to meet its associated second recovery point objective:
         increasing a first assigned bandwidth quota for the first replication session based at least in part on a first size of data to be replicated as part of the first replication session and a first expected syncing progress metric of the first replication session, the first expected syncing progress metric being determined based at least in part on its associated first recovery point objective; and
         decreasing a second assigned bandwidth quota for the second replication session based at least in part on a second size of data to be replicated as part of the second replication session and a second expected syncing progress metric of the second replication session, the second expected syncing progress metric being determined based at least in part on its associated second recovery point objective.

2. The apparatus of claim 1 wherein identifying whether the first replication session is not expected to meet its associated first recovery point objective based at least in part on the first syncing progress metric comprises:
   determining the first expected syncing progress metric for the first replication session based at least in part on its associated first recovery point objective; and
   comparing the first syncing progress metric to the first expected syncing progress metric.

3. The apparatus of claim 2 wherein determining the first expected syncing progress metric is further based at least in part on a syncing time characterizing a length of time that the first replication session has been running.

4. The apparatus of claim 1 wherein the assigned bandwidth quota for the first replication session is determined based at least in part on the first syncing progress metric, a first syncing time characterizing a length of time that the first replication session has been running, and the first size of data to be replicated as part of the first replication session.

5. The apparatus of claim 1 wherein increasing the first assigned bandwidth quota comprises determining a first expected bandwidth quota for the first replication session and decreasing the second assigned bandwidth quota comprises determining a second expected bandwidth quota for the second replication session.

6. The apparatus of claim 5 wherein the first expected bandwidth quota is determined based at least in part on the first size of data to be replicated as part of the first replication session and its associated first recovery point objective and the second expected bandwidth quota is determined based at least in part on the second size of data to be replicated as part of the second replication session and its associated second recovery point objective.

7. The apparatus of claim 5 wherein increasing the first assigned bandwidth quota and decreasing the second assigned bandwidth quota comprises:
   determining a permissible reduction in the second assigned bandwidth quota based at least in part on the second expected bandwidth quota for the second replication session; and
   determining whether a magnitude of the permissible reduction in the second assigned bandwidth quota is sufficient to raise the first assigned bandwidth quota of the first replication session such that the first replication session will meet its associated first recovery point objective.

8. The apparatus of claim 1 wherein increasing the first assigned bandwidth quota comprises determining a magnitude of increase of the first assigned bandwidth quota for the first replication session based at least in part on:
the first size of data to be replicated as part of the first replication session; and
a difference between the first expected syncing progress metric of the first replication session and the first syncing progress metric of the first replication session.

9. The apparatus of claim 8 wherein determining the magnitude of the increase of the first assigned bandwidth quota for the first replication session is further based at least in part on a difference between a first expected bandwidth quota for the first replication session and the assigned first bandwidth quota for the first replication session.

10. The apparatus of claim 1 wherein the at least one processing device is further configured to perform the step of identifying (i) a first subset of the two or more replication sessions not expected to meet their associated recovery point objectives based at least in part on their determined syncing progress metrics and (ii) a second subset of the two or more replication sessions expected to meet their associated recovery point objectives based at least in part on their determined syncing progress metrics.

11. The apparatus of claim 10 wherein the at least one processing device is further configured to perform the step of determining whether a magnitude of permissible reduction in the assigned bandwidth quotas of replication sessions in the second subset is sufficient to raise the assigned bandwidth quotas of replication sessions in the first subset such that each of the replication sessions in the first subset will meet its associated recovery point objective.

12. The apparatus of claim 11 wherein the at least one processing device is further configured to perform the step of, responsive to determining that the magnitude of permissible reduction in the assigned bandwidth quotas of replication sessions in the second subset is sufficient to raise the assigned bandwidth quotas of replication sessions in the first subset such that each of the replication sessions in the first subset will meet its associated recovery point objective, updating the bandwidth quotas assigned to each of the replication sessions in the first subset.

13. The apparatus of claim 11 wherein the at least one processing device is further configured to perform the steps of, responsive to determining that the magnitude of permissible reduction in the assigned bandwidth quotas of replication sessions in the second subset is not sufficient to raise the assigned bandwidth quotas of replication sessions in the first subset such that each of the replication sessions in the first subset will meet its associated recovery point objective:
determining a sorting of the replication sessions in the first subset according to updates of assigned bandwidth quotas needed for meeting their associated recovery point objectives;
selecting a subset of the replication sessions in the first subset based at least in part on the determined sorting and the magnitude of permissible reduction in the assigned bandwidth quotas of the replication sessions in the second subset; and
updating the bandwidth quotas assigned to the selected subset of the replication sessions in the first subset.

14. A computer program product comprising a non-transitory processor-readable storage medium having stored therein program code of one or more software programs, wherein the program code when executed by at least one processing device causes the at least one processing device to perform steps of:
determining a syncing progress metric for each of two or more replication sessions established between a source storage system and a destination storage system, each of the two or more replication sessions being associated with a recovery point objective and having an assigned bandwidth quota;
identifying whether at least a first one of the two or more replication sessions is not expected to meet its associated first recovery point objective based at least in part on its determined first syncing progress metric;
identifying whether at least a second one of the two or more replication sessions is expected to meet its associated second recovery point objective based at least in part on its determined second syncing progress metric; and
responsive to (i) identifying that the first replication session is not expected to meet its associated first recovery point objective and (ii) identifying that the second replication session is expected to meet its associated second recovery point objective:
increasing a first assigned bandwidth quota for the first replication session based at least in part on a first size of data to be replicated as part of the first replication session and a first expected syncing progress metric of the first replication session, the first expected syncing progress metric being determined based at least in part on its associated first recovery point objective; and
decreasing a second assigned bandwidth quota for the second replication session based at least in part on a second size of data to be replicated as part of the second replication session and a second expected syncing progress metric of the second replication session, the second expected syncing progress metric being determined based at least in part on its associated second recovery point objective.

15. The computer program product of claim 14 wherein increasing the first assigned bandwidth quota comprises determining a first expected bandwidth quota for the first replication session and decreasing the second assigned bandwidth quota comprises determining a second expected bandwidth quota for the second replication session.

16. The computer program product of claim 15 wherein increasing the first assigned bandwidth quota and decreasing the second assigned bandwidth quota comprises:
determining a permissible reduction in the second assigned bandwidth quota based at least in part on the second expected bandwidth quota for the second replication session; and
determining whether a magnitude of the permissible reduction in the second assigned bandwidth quota is sufficient to raise the first assigned bandwidth quota of the first replication session such that the first replication session will meet its associated first recovery point objective.

17. A method comprising:
determining a syncing progress metric for each of two or more replication sessions established between a source storage system and a destination storage system, each of the two or more replication sessions being associated with a recovery point objective and having an assigned bandwidth quota;

identifying whether at least a first one of the two or more replication sessions is not expected to meet its associated first recovery point objective based at least in part on its determined first syncing progress metric;

identifying whether at least a second one of the two or more replication sessions is expected to meet its associated second recovery point objective based at least in part on its determined second syncing progress metric; and responsive to (i) identifying that the first replication session is not expected to meet its associated first recovery point objective and (ii) identifying that the second replication session is expected to meet its associated second recovery point objective:

increasing a first assigned bandwidth quota for the first replication session based at least in part on a first size of data to be replicated as part of the first replication session and a first expected syncing progress metric of the first replication session, the first expected syncing progress metric being determined based at least in part on its associated first recovery point objective; and decreasing a second assigned bandwidth quota for the second replication session based at least in part on a second size of data to be replicated as part of the second replication session and a second expected syncing progress metric of the second replication session, the second expected syncing progress metric being determined based at least in part on its associated second recovery point objective;

wherein the method is performed by at least one processing device comprising a processor coupled to a memory.

18. The method of claim 17 wherein increasing the first assigned bandwidth quota comprises determining a first expected bandwidth quota for the first replication session and decreasing the second assigned bandwidth quota comprises determining a second expected bandwidth quota for the second replication session.

19. The method of claim 18 wherein increasing the first assigned bandwidth quota and decreasing the second assigned bandwidth quota comprises:

determining a permissible reduction in the second assigned bandwidth quota based at least in part on the second expected bandwidth quota for the second replication session; and determining whether a magnitude of the permissible reduction in the second assigned bandwidth quota is sufficient to raise the first assigned bandwidth quota of the first replication session such that the first replication session will meet its associated first recovery point objective.

* * * * *